L. A. WATSON.
CAR LIGHTING SYSTEM.
APPLICATION FILED JUNE 14, 1916.
1,283,380.
Patented Oct. 29, 1918.
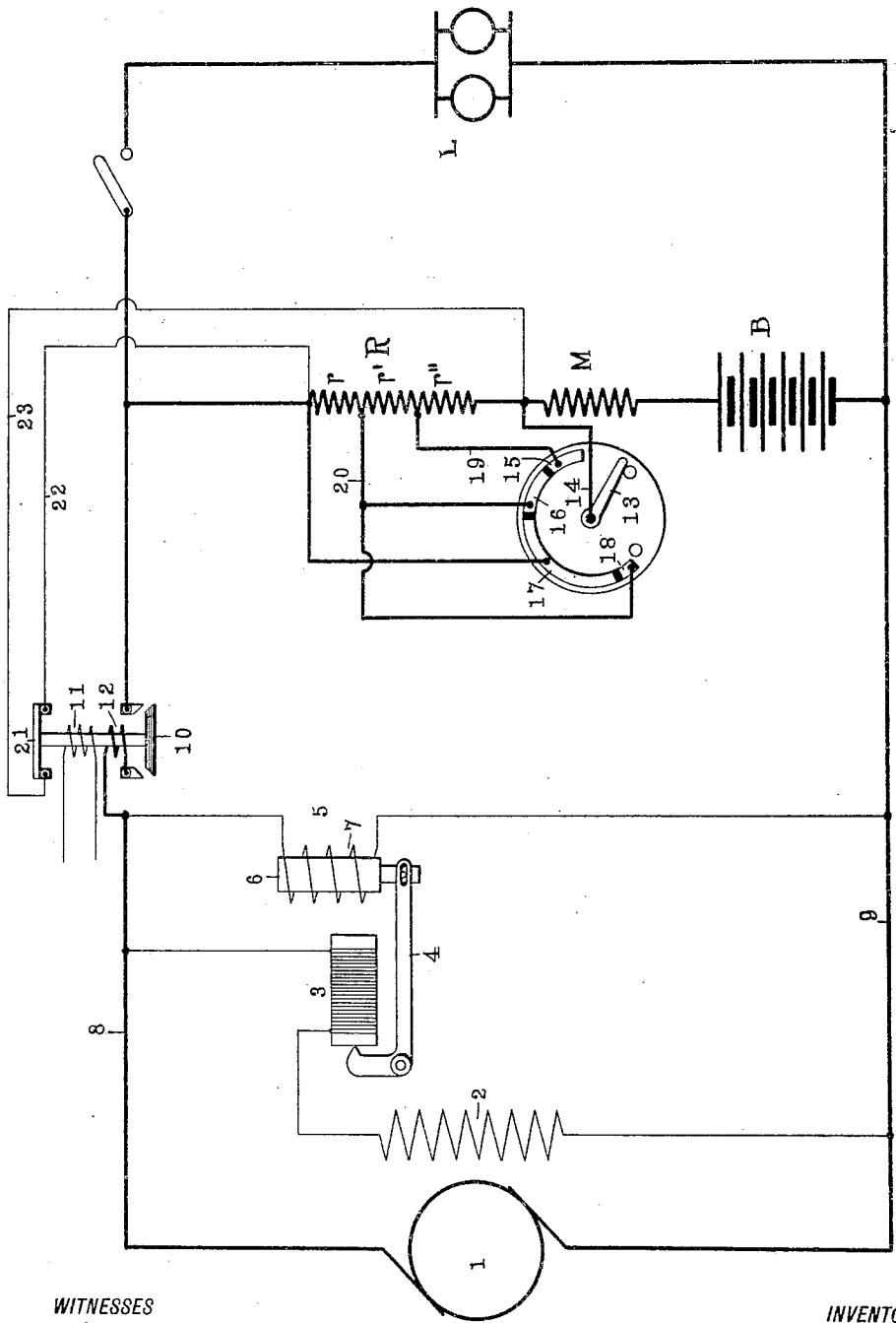
WITNESSES
C. F. Polk.
J. Thomson
INVENTOR
L. A. Watson
BY
Drull, Warfield & Drull
ATTORNEYS

UNITED STATES PATENT OFFICE.

LEONARD A. WATSON, OF NEW YORK, N. Y., ASSIGNOR TO THE SAFETY CAR HEATING AND LIGHTING CO., OF NEW YORK, N. Y., A CORPORATION OF NEW JERSEY.

CAR-LIGHTING SYSTEM.

1,283,380.   Specification of Letters Patent.   Patented Oct. 29, 1918.

Application filed June 14, 1916. Serial No. 103,655.

*To all whom it may concern:*

Be it known that I, LEONARD A. WATSON, a citizen of the United States, residing at New York, in the county of New York and State of New York, have invented certain new and useful Improvements in Car-Lighting Systems, of which the following is a full, clear, and exact description, such as will enable others skilled in the art to which it appertains to make and use the same.

This invention relates to railway electric lighting systems, and more particularly to the automatic regulation of axle driven car lighting generators employed to deliver current to a translating lamp circuit and a storage battery associated in a system to supply the lamps when, for example, the train speed is below that at which the generator is designed to carry the lamp load.

One of the objects of the invention is to provide simple and efficient electric controlling means to automatically govern the charging current delivered to the battery in accordance with its state of charge.

A further object is to simplify the character of the generator regulator, and to maintain the charging current to the battery within predetermined limits during the charging from depleted to full condition, while insuring protection against injurious overcharge.

Other objects will be in part obvious and in part noted hereinafter in connection with the description of the accompanying drawing which illustrates an exemplary embodiment of the invention.

It is customary in car lighting systems to provide a generator driven by the car axle, and having a shunt field winding with a regulating resistance in its field circuit, together with an automatic switch in the main circuit designed to connect the generator with the load when the generator voltage attains a value for efficient current delivery.

In the drawing there is shown a generator 1 having a shunt field 2, with a carbon pile resistance 3 serially included in the field circuit. The carbon pile is of a character to vary its resistance in accordance with the variation in pressure of the contacting carbons, which pressure is governed by a bell crank lever 4, normally biased either by a spring or by gravity to compress the carbons to a minimum resistance value.

The regulating movement of the lever 4 is effected and controlled by a solenoid-and-plunger 5, comprising a movable plunger 6 attached to the long arm of the lever 4 and a voltage coil 7 connected across the generator mains 8 and 9. A main switch 10 is positioned in one of the mains between the generator and the battery, and is automatically controlled to close by a shunt coil 11 and to open by a series coil 12, in accordance with the train speed. A battery B and lamps L are connected in parallel circuits across the mains 8—9.

The voltage coil 7, which constitutes the electro-magnetic controlling means for effecting the generator regulation to compensate for speed changes, is designed to maintain the generator voltage substantially constant while the main switch 10 is closed. In practice, with the sixteen cell battery commonly employed in the car lighting industry, the coil 7 is preferably designed to maintain the generator voltage at approximately 38.5 volts.

Where a storage battery is connected for charging by a generator, it is well known that if the generator is regulated solely for the maintenance of constant voltage a very heavy inrush of current will occur when the battery is depleted, and in car lighting systems the volume of this current will, if not tending to injure the battery, cause belt slipping or other difficulties in the operation of the generator. To regulate the charging current for efficiently, I have therefore provided a resistance R in series with the battery, this resistance being divided into sections $r$, $r'$ $r''$, automatically excluded from and included in circuit as will be described hereinafter. There is also provided in the battery circuit an ampere hour meter M, or other mechanism which quantitatively measures the charge and discharge of current to and from the battery, or other suitable electro-magnetic or electrical device indicative of the available stored current therein, arranged to control the resistance R in accordance with the condition of the battery charge and thereby to determine the resistance of the battery circuit and the consequent amperage of the charging current.

The meter M may be provided with a suitable armature and field winding so connected that the current to the battery operates the meter in one direction and the current from the battery operates it in the reverse direction. The meter is also provided with suitable contacts, illustrated schematically, whereby suitable circuits are established by the movable meter pointer 13 in accordance with its position as indicative of the instant battery charge. As illustrated, the meter has its pointer contact connected by line 14 to the battery side of the resistance R, and has also segmental contacts 15, 16, 17, and 18, which are connected to predetermined points of the resistance R. More specifically the contact 15 is connected by lead 19 to the generator side of the resistance section $r''$, the contact 16 is connected by lead 20 to the generator side of the resistance section $r'$, the contact 17 is connected to the generator side of resistance section $r$, and contact 18 is connected by lead 20 to the battery side of resistance section $r$, or other suitable point.

In the drawing, the meter pointer indicates a depleted battery condition, and at this time the resistance sections $r$, $r'$ and $r''$ are all included in circuit so that when the main switch closes the charging current delivered to the battery is limited by said resistance with the generator regulator maintaining the voltage at about 38 volts, as mentioned above, and by properly proportioning the resistance R, it will be seen that the charging current (or the generator output with the lamp circuit open) can be kept below a desired limit such as, for example, 65 amperes. As the battery charge increases, and due to the rise in its counter-electro-motive force, the charging current tends to taper or decrease, but the meter pointer 13 will move to engage contact 15 and thereby short circuit the resistance section $r''$ which will permit the charging current to increase abruptly to the original limit of, for example, 65 amperes. Thereafter as the charge tends to taper again, the meter pointer comes in contact with the segment 16 and the resistance section $r'$ is also short circuited so that the battery circuit resistance is decreased further and the charging current again raised to the desired amount. When the battery has reached a state of charge corresponding to about sixty per cent. of full charge, if the generator voltage is maintained at 38.52, the meter contact 13 engages the segment 17 and short circuits the remainder of the resistance R, thus permitting the full charging current to be delivered. After this time the battery will inherently protect itself from overcharge by tapering the current to a negligible value of about 5 amperes. If desired, however, the segment contact 18 may be provided for engagement by the meter pointer 13 when the battery is fully charged to thereby include in the circuit the resistance section $r$, or other suitable amount, and float the battery on the line so that it will neither receive nor discharge current. This feature, however, is not necessary to the satisfactory protection of the battery or operation of the system.

In order to prevent waste of current when the battery is supplying the lamps, there are provided back contacts 21 on the main switch to complete circuit by leads 22 and 23 around the resistance R, as will be understood.

It will also be understood that the meter is provided with automatic means to compensate for internal battery losses and further provided with manual resetting means to establish synchronism with the state of battery charge, if desired. While, for simplicity of illustration, the meter is shown as establishing direct contact between its movable pointer and segments for the various circuits described, it will be understood that the meter may be constructed, if desired, to control telegraphic relays in turn controlling the circuits of the resistance sections.

It will be observed that the voltage coil 7 is permanently connected in circuit to effect the regulation throughout the operation and that this coil is responsive at all times to generator voltage conditions. In case of breakage of a battery lead, it will thus be seen that the voltage is still maintained constant. The sections $r$, $r'$, $r''$, of the resistance R in the battery circuit may be adjustable and the time and sequence of the shunt circuits then about may be altered as desired by mechanical alteration of the meter. Under all circumstances, however, it will be noted that the resistance may be calculated to maintain the charging current within desired limits for protecting all the elements in the system at the beginning of battery charging, and at all times thereafter.

Having described my invention, what I claim as new and desire to secure by Letters Patent is:

1. In railway car lighting systems in combination, an axle driven generator, a storage battery connected across the generator mains, means responsive solely to generator voltage for regulating said generator, a resistance connected in the battery circuit, and means to automatically regulate the amount of said resistance in circuit in accordance with the state of battery charge for maintaining the charging current within predetermined limits and for stopping charging current at the completion of charge while the battery remains in circuit.

2. In railway car lighting systems in combination, a generator having a shunt field winding, a variable resistance for regulating the generator field, means responsive solely to generator voltage for controlling said resistance, a battery to be supplied by said generator, a resistance in series with said battery to regulate the charging current, and an ampere hour meter for measuring the current delivered to and from said battery and controlling said second mentioned resistance in accordance with the state of battery charge, for the purpose set forth.

3. In a railway car lighting system, in combination, a variable speed generator, automatic regulating means therefor, a storage battery adapted for connection across the generator mains, a sectional resistance connected with the battery circuit, and automatic means to insure maximum effectiveness of said resistance at the beginning of battery charging, minimum effectiveness of said resistance during a final period of battery charging, and a mean effectiveness of said resistance after completion of battery charging.

4. In railway car lighting systems, in combination, a variable speed generator, automatic regulating means therefor, including a coil responsive to generator voltage and permanently connected across the generator mains, a storage battery, a resistance in series with said battery, and an ampere hour meter in series with said battery measuring the charging and discharging current, said meter having contacts arranged to control said resistance in accordance with the condition of battery charge to limit the initial charging current to the battery when depleted, and to protect the battery against overcharge.

5. In a railway car lighting system, in combination, a variable speed shunt wound generator; regulating means therefor to maintain voltage constancy; a storage battery adapted for connection across the generator mains; and automatic means, independent of said regulating means, to depress the initial charging current to restore full charging current during a subsequent period, and to stop current to the battery at the completion of charge while the battery remains in circuit.

In testimony whereof I affix my signature, in the presence of two witnesses.

LEONARD A. WATSON.

Witnesses:
J. THOMSON,
C. J. KULBERG.

Copies of this patent may be obtained for five cents each, by addressing the "Commissioner of Patents, Washington, D. C."